(12) United States Patent
Letard

(10) Patent No.: US 9,193,203 B2
(45) Date of Patent: Nov. 24, 2015

(54) TREATMENT FOR PRINTING A SURFACE WITH A REVERSIBLE INK

(75) Inventor: Jean-Francois Letard, Canejean (FR)

(73) Assignee: Centre National de la Recherche Scientifique—CNRS, Paris (FR)

( * ) Notice: Subject to any disclaimer, the term of this patent is extended or adjusted under 35 U.S.C. 154(b) by 146 days.

(21) Appl. No.: 13/810,515

(22) PCT Filed: Jul. 21, 2011

(86) PCT No.: PCT/FR2011/051767
§ 371 (c)(1),
(2), (4) Date: Jan. 16, 2013

(87) PCT Pub. No.: WO2012/010807
PCT Pub. Date: Jan. 26, 2012

(65) Prior Publication Data
US 2013/0127947 A1     May 23, 2013

(30) Foreign Application Priority Data

Jul. 22, 2010   (FR) ...................................... 10 55976

(51) Int. Cl.
*C09D 11/00*    (2014.01)
*B41M 5/28*    (2006.01)
*C09D 11/50*    (2014.01)

(52) U.S. Cl.
CPC ............... *B41M 5/282* (2013.01); *C09D 11/50* (2013.01); *B41M 5/283* (2013.01); *B41M 5/284* (2013.01)

(58) Field of Classification Search
CPC ................... C09D 11/50; C09D 5/26; B41M 5/282–5/284; G03C 2200/39; G03C 1/685
USPC ........... 347/84, 179; 106/31.13, 31.14, 31.23, 106/31.43, 31.64; 427/331; 430/270.1
See application file for complete search history.

(56) References Cited

U.S. PATENT DOCUMENTS

2010/0178511 A1*   7/2010   Letard et al. .................. 428/404

FOREIGN PATENT DOCUMENTS

DE          10307513 A1 *   9/2004
DE          10307514 A1 *   9/2004

* cited by examiner

*Primary Examiner* — Matthew Luu
*Assistant Examiner* — Rut Patel
(74) *Attorney, Agent, or Firm* — Miller, Matthias & Hull LLP

(57) ABSTRACT

The invention relates to a treatment for printing a surface with an ink that includes a compound that exhibits a change of electronic spin state as a function of temperature, imparting optical properties such that the ink is visible in a temperature range that includes an ambient temperature of around 20° C. and is transparent in the visible spectrum when the ink is brought to a temperature above said range and then brought back down to a temperature within the range.

13 Claims, 2 Drawing Sheets

TREATMENT FOR PRINTING A SURFACE WITH A REVERSIBLE INK

CROSS-REFERENCE TO RELATED APPLICATIONS

This application is a U.S. national stage filing under 35 USC §371 of International Patent Application No. PCT/FR2011/051767 filed on Jul. 21, 2011, which claims priority under the Paris Convention and 35 USC §119 to the French Patent Application No. 10 55976, filed on Jul. 22, 2010.

FIELD OF THE DISCLOSURE

The invention relates to the field of printing a surface with ink, and/or a treatment of the printing of this surface with such an ink.

BACKGROUND OF THE DISCLOSURE

The invention therefore relates in general to a treatment for printing a surface with an ink.

In spite of the significant growth in the digitization of printable documents and their accessibility on screens where they are easily viewed, no tangible decrease in the consumption of paper for printing such documents has been observed. Studies show that users still rely on hardcopy printouts in order to read documents.

To take environmental questions into consideration, proposals for the reuse of printed paper concern the nature of the ink used for printing. The goal is an ink that can be erased (rendering the paper blank once again) by a thermal and/or chemical treatment.

Document U.S. Pat. No. 5,922,115 proposes such an ink, which is erased when it is added to a reagent that causes the color to fade at a temperature of about 140° C. However, the reagent proposed in this document is costly and the paper used must be of a special design to enable it to withstand temperatures as high as 140° C.

In addition, a method for photocatalysis of the ink is known from document EP-2110417, but this method requires about 16 hours to obtain a blank page.

Also, such methods are not reversible. The ink is erased with no possibility of its reappearing. It may be advantageous in certain applications, particularly those related to security, to cause the printing to be visible once again.

The invention improves this situation.

SUMMARY OF THE DISCLOSURE

For printing, it proposes the use of an ink based on a compound that exhibits a change of electron spin state as a function of temperature. Such a compound gives the ink optical properties that vary with the temperature, so that the ink is:

visible within a temperature range that includes an ambient temperature of about 20° C., and transparent in the visible spectrum when the ink is brought to a temperature outside said range and then brought back to a temperature within the range.

In particular, said compound is preferably in the form of nanometric particles, advantageously suitable for ink jet printing techniques.

Thus the invention first concerns a method of treatment for printing a surface with an ink, and in particular, this ink contains such a spin-state changing compound.

"Ambient temperature" is understood to mean a normal utilization temperature for the ink, for example in common office printing applications where such temperatures are typically around 20° C.

In a particularly advantageous manner, the visibility of the ink follows a hysteresis cycle as a function of temperature, the ink being:

visible, printed at a temperature within said range, and transparent, after thermal treatment at a temperature outside said range and then brought back to a temperature within the range.

In the example embodiments described below, said temperature "outside the range" is higher than the temperatures within the range, and the thermal treatment then corresponds to heating the ink.

Thus, in the sense of the invention, there is no need to maintain the ink for example above a certain temperature for it to remain lastingly invisible. Once the ink is rendered transparent after heating, it can be returned to ambient temperature where it remains lastingly invisible.

In another advantage offered by such an ink compound, the thermal treatment to render the ink invisible only lasts for a few seconds. For example, five seconds are sufficient. The method can then comprise a thermal treatment of the surface printed with the ink in order to render the ink transparent in the visible spectrum. In particular, the length of the treatment is only a few seconds (compared to more than 16 hours in the prior art of EP-2110417, presented above).

In one embodiment of the invention, thermal treatment by raising the temperature to between 50 and 100° C. renders the ink invisible. Such temperatures are perfectly compatible with applying the invention to ink printing on sheets of standard weight paper.

However, in one particular embodiment, the temperature threshold below which the ink can become visible again can be about −150 to −200° C. Thus, once the ink is erased, it would be difficult for it to reappear at "normal" usage temperatures (around ambient temperature).

In one variant, this threshold can be around 10° C., according to the hysteresis of the particular material chosen. This embodiment advantageously allows the ink to reappear easily, for applications related to security for example.

In this embodiment, the ink can become visible once again by lowering the temperature to a low temperature of around or below 10° C.

Depending on the type of material used, the low temperature can be below, and in particular around or below, −150° C.

A material having such general properties of change in optical behavior according to a temperature hysteresis, and having offered satisfactory results, contains for example at least one type of molecule in the triazole family. This molecule comprises a transition metal of electron configuration $3d^4$, $3d^6$ and/or $3d^7$, and nitrogen-containing ligands of which at least one ligand comprises a triazole. As one will see in the example embodiments given below, particularly with reference to FIG. 3, it is advantageous for at least one ligand to contain a water molecule bound to this ligand by a hydrogen bond.

Advantageously, such a compound can be obtained in the form of nanometric particles. Then the particle sizes are not sufficiently large to cause excessive optical diffusion which could interfere with the optical properties of the ink in the visible spectrum, and the nanometric particle size makes this material a choice candidate for use in an ink intended for ink jet printing through nozzles for example.

Such particles are usually in the form of micrometric grains. It is then advantageous to synthesize them under ultrasound in order to limit their size to several hundred nanometers, for example, which is suitable for ink jet applications.

Document FR-2,917,410 should be mentioned, which discloses (page 20, lines 20-30 of this document) the preparation of an emulsion in which the size of the water droplets determines the size of the molecules polymerized in a micellar medium, with application of ultrasound solely for mixing purposes (like a vortex effect), while the application of ultrasound in the sense of the invention has the effect of "breaking up" the particles to reduce them to a nanometric size.

In the document FR-2,917,410, to produce 1 gram of particles, the micellar route with surfactant typically requires the use of 100 mL diethyl ether to denature the emulsion and then three rinses with 100 mL diethyl ether to eliminate all the surfactant (therefore using 400 mL of diethyl ether for 1 g of product), while the invention advantageously produces a quantity of nanoparticles of 1 g of final product with simply three rinses in 5 mL water.

In conclusion, one can see that the synthesis of particles by the micellar route per document FR-2,917,410 is in fact difficult to ramp up to large scale production, primarily due to the large amounts of solvent involved, while synthesis by ultrasound is much more adaptable.

Thus, the invention also relates to a method for producing a compound containing at least one molecule comprising a transition metal of electron configuration $3d^4$, $3d^6$ and/or $3d^7$ and nitrogen-containing ligands comprising at least one triazole ligand. Such a method comprises a synthesis of said molecule, this synthesis being in particular assisted by the use of ultrasound.

The invention also relates to an ink for printing on a surface, and in particular an ink comprising a compound exhibiting a change of electron spin state as a function of temperature, imparting optical properties such that said ink is:

visible within a temperature range that includes an ambient temperature of around 20° C., and transparent in the visible spectrum when the ink is brought to a temperature outside of said range and then brought back to a temperature within the range.

Preferably, the particle size of said compound is nanometric in scale, as indicated above.

The invention also relates to a cartridge containing such an ink. In particular, one can see that, because of the fluidity of the ink according to the invention, the ink is perfectly compatible with currently known ink jet techniques and no special arrangement is necessary for it to be incorporated and used in a conventional ink cartridge.

The invention also relates to a printing device comprising at least one such cartridge. In particular, such a device can comprise means for applying jets of ink onto the aforesaid surface. It can then be a printer with no special arrangement required, as the ink according to the invention is perfectly compatible with this type of ink jet printing technique.

The invention also relates to a device comprising means for advancing a surface printed with an ink according to the invention, to a thermal treatment chamber comprised in this device, in order to render the ink invisible as indicated above. Of course, such a device can be integrated into a printing device of the above type. For example, one possible embodiment would consist of a photocopier type of printing device, comprising a cartridge of ink according to the invention for printing the ink on a sheet, as well as a thermal treatment chamber for rendering invisible the ink on other sheets to be recycled.

Said thermal treatment can be performed by laser irradiation from a laser source comprising a wavelength within an optical absorption band of the ink. In practice, this wavelength can be in the infrared, in order to heat said molecules selectively and generate the spin transition more easily without necessarily raising the temperature of all the ink and paper to the spin transition temperature.

The device containing said thermal treatment chamber can thus incorporate such a laser source.

BRIEF DESCRIPTION OF THE DRAWINGS

Other features and advantages of the invention will be apparent from reading the description of some embodiments presented as examples, and from examining the drawings in which.

DETAILED DESCRIPTION

Figure 1:
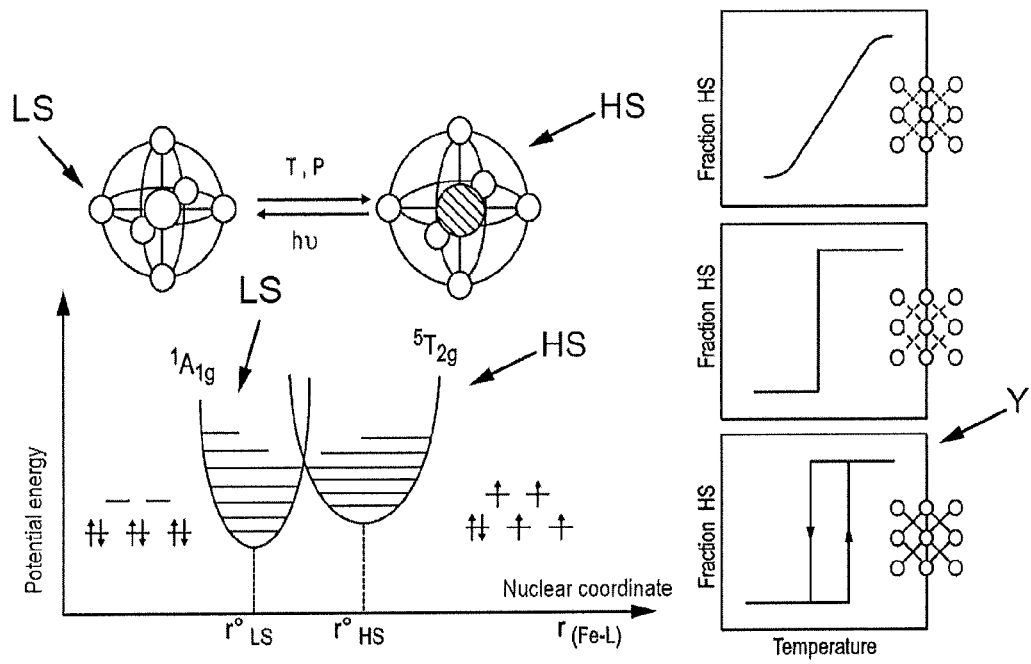
FIG. 1 illustrates the spin transition phenomenon for the Fe(II) ion, in particular with an evolution of the high spin (HS) fraction as a function of temperature for an increasingly cooperative system.

The invention proposes the use of a spin transition material as thermochromic pigment within an ink. As an example, the spin transition phenomenon can be encountered in a coordination complex comprising a transition metal of the electron configuration $3d^4$, $3d^6$ or $3d^7$ and nitrogen-containing ligands. Macroscopically, the compounds are in the form of crystals or polymers. The spin state transition manifests as a significant modification of the mechanical, dielectric, magnetic, and optical properties. An advantage of these compounds when implementing the invention is thermal hysteresis. In other words, within a given temperature range and as a function of its thermal, mechanical, optical "history", the system can be obtained in two different spin states, the low spin state LS and the high spin state HS, as represented in FIG. 1. Note the shape of a hysteresis cycle as a function of temperature in graph Y. This particular characteristic will be described in more detail with reference to FIG. 2.

The insertion of such compounds into a compatible ink has been implemented in the sense of the invention, for example with depositing ink by an ink jet technique, while maintaining the advantageously reversible switchover properties (modification of the color, magnetic response, volume of the material during the switch from high spin HS to low spin LS). In particular, the transition temperature is adjustable based on the nature of the material. The particle size of the material inserted into the ink can typically be several microns to a dozen nanometers in order to optimize the visual appearance, the viscosity of the ink, the "oil" absorption, or other.

The materials can be obtained at the nanometric scale (particle size from 20 to 200 nm), while presenting various possible colors and adjustable transition temperatures. Good chemical compatibility and good conservation of switch properties can be observed. The resistance of these inks to ultraviolet after application has also been verified.

The principal advantages of inserting such synthesized materials into an ink are numerous:
- applying the ink to any type of support, for example using ink jet techniques,
- switching the "color" of the ink from visible to invisible by raising the temperature,
- developing an irreversible ink (as the low temperature of the hysteresis is practically that of liquid nitrogen) with erasure controlled by heating, thus encouraging the use of reusable paper,
- possible applications in the field of security and/or traceability,
- possible applications in modifying the color of a light source (for example an LED light) using such a thermochromic ink,
- possible applications as protective layers (filter) controllable by an external stimulus (temperature, pressure, light, gas, etc.).

In fact, when applied to the field of security and/or traceability, the measurement of the changeover temperature (color change of the ink) can in itself provide authentication and/or traceability of the product to be protected. During the changeover, the ink can become transparent and thus reveal information written in a sub-layer.

As an example, tests were conducted on powders of the family of Fe(II) R-triazole complexes. The characteristic diameter of the grains varies between several dozen nanometers and several micrometers. These compounds have colors which, in the high spin state and in the low spin state, depend on their chemical compositions.

More particularly, it can be a molecule of the type:

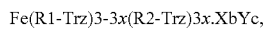

where:
- R1-Trz and R2-Trz are 1,2,4-triazole ligands having an R1 substituent comprising an alkyl-OH group and R2 an alkyl group or an R1'R2'N group in which R1' and R2' each independently of the other represent a hydrogen atom H or an alkyl radical,
- Xb represents 3-nitrophenyl sulfonate, and
- Yc represents at least one anion which has a dye group, which advantageously allows obtaining a set of two "colors" which can be chosen according to the desired application.

In the application in the sense of the invention, one of the colors is in the visible range in the low spin state and the other "color", in the high spin state, is outside the visible range, for example in the infrared as one will see in an example embodiment described below.

A method for obtaining a compound of this type in the form of nanoparticles is described in document FR-2,894,581. Its encapsulation to increase the hysteresis effect (spreading apart the rising and descending edges of the temperature) is described in document FR-2,917,410.

Figure 2:
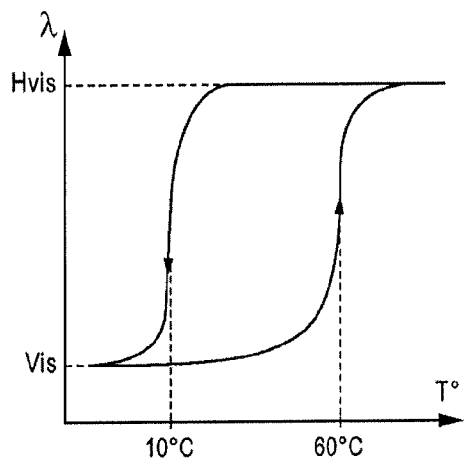
FIG. 2 illustrates an example of a hysteresis cycle of a material appropriate for a "reversible" ink and able to be visible below 10° C. and invisible above 60° C.

FIG. 2 shows an example of a variation in the optical re-emission properties as a function of temperature, in a hysteresis cycle typical of this material. Below 10° C. and for a first application of the ink at less than 60° C., the ink is visible and emits a wavelength (λ) in the visible spectrum, therefore between 0.4 and 0.65 micrometers (labeled Vis in FIG. 2). By raising the temperature of the material to more than 60° C., the ink becomes "invisible": in actuality, it emits in the infrared, therefore at more than 0.65 micrometers (labeled Hvis in FIG. 2). By lowering the temperature again, for example down to 20° C., it remains "invisible" at the upper plateau Hvis in FIG. 2. If the temperature subsequently falls below 10° C., the ink becomes visible again, at the lower plateau Vis in FIG. 2.

It has also been demonstrated that it is possible to change the ink color by incorporating chosen coloring agents (food-safe for example) as described in document PCT/FR2010/050122. In actuality, this type of material generally reemits the light in two distinct wavelength ranges depending on its spin state. In the context of the invention, the first range is within the visible spectrum (before increasing the temperature), while the second range is outside the visible spectrum (for example in the infrared). A pair of ranges can therefore be chosen (one color within the visible and a range of wavelengths outside the visible) which are appropriate for the applications considered, by changing the type of coloring agent.

Additionally or alternatively, another material can be provided of the type described in document EP-0842988. This is a chemical compound with a spin transition, again including a matrix comprising molecules each formed of a metal-ligand complex, and an anion. In particular, this matrix comprises at least one water molecule bound to the ligand by a hydrogen bond. Also in this matrix, the metal consists of one or more metal ions having an electron configuration in $d^4$, $d^5$, $d^6$ or $d^7$ where the ligand is a substituted 1-2-4 triazole, in which the substituting radical comprises an alcohol group (alkyl-OH), and in which the anion is an organic derivative combining both tosylate and sulfate.

In an example application:
- the metal is the iron ion $Fe^{2+}$ (electron configuration in d6) or an iron-zinc alloy,
- the ligand is 4-(2'-hydroxyethyl)-1,2,4 triazole, and
- the anion is 3-nitro-phenylsulfonate.

Figure 3:
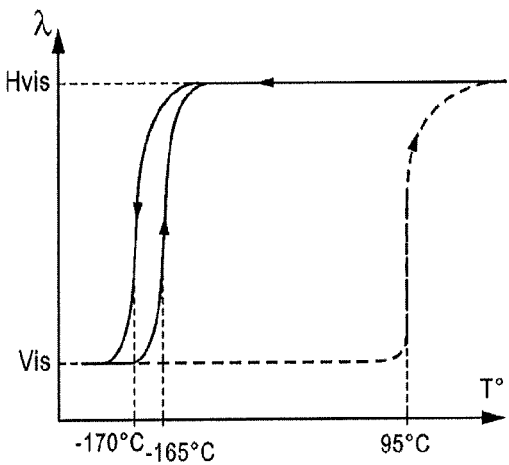
FIG. 3 illustrates an example of an "apparent" hysteresis cycle of a material appropriate for an "irreversible" ink and only presenting a true hysteresis cycle below −160° C., FIG. 4 schematically illustrates a method for synthesizing such a material, in particular assisted by use of ultrasound, FIG. 5 schematically illustrates an ink in a cartridge of a printing device according to the invention, as well as a thermal treatment device for treating a surface printed with the ink, by laser sweep, to render the ink invisible.

Referring to FIG. 3, such a material has the particular characteristic of benefiting from an "apparent" hysteresis. It has a spin transition at a temperature of about 100° C. (or even lower, 95° C. here). This transition is irreversible within temperature ranges near ambient temperature. The optical properties related to this transition correspond to the change from a color within the visible spectrum to an optical emission outside the visible spectrum. The true hysteresis cycle is in fact located at very low temperatures (between −170 and −165° C.). The ink can reappear in the visible spectrum at −170° C. and becomes invisible this time at −165° C. Thus the ink is lastingly erasable by raising the temperature to 100° C., in a more or less irreversible manner under normal usage conditions for an ink.

A first irreversible transition temperature from low spin (emission in the visible, Vis) to high spin (emission outside the visible, Hvis, for example in the infrared) is for example 95° C. (dotted line in FIG. 3). Then, the transition temperatures from high spin Hvis to low spin Vis and the reverse from low spin Vis to high spin Hvis are once again respectively at about −170° C. and −165° C. Thus, in the range between −150° C. and 70° C., the thermal changeover irreversibly causes the material to switch from the initial low spin state (vis plateau) to the high spin state (Hvis plateau).

This spin transition property of such a material could be explained by a transformation of the bond involving the water molecule and its ligands, at about 100° C.

Figure 4:
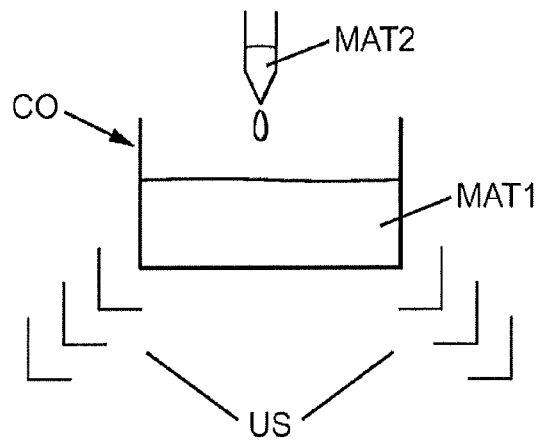

However, the simple synthesis of such materials, particularly the material described in document EP-0842988, does not allow its direct application to ink production, due to the fact that the size of its particles is too large. One contribution of the invention is the synthesis of this material under ultrasound in order to "break up" the particles during formation. The material obtained is then in the form of nanometric particles well suited for use in an ink compatible with ink jet techniques using conventional nozzles. Thus, with reference to FIG. 4, a material of this type during synthesis by mixing two materials MAT1 and MAT2, for example in the form of liquid solutions in a container CO, is bombarded with ultrasound US.

In particular, in an embodiment described here as an example, to a first flask is added 10 mg ascorbic acid with 3 mL water and an equivalent of iron salt $Fe(3-NO_2-1-ps)_2$ where $3-NO_2-1-ps$ corresponds to 3-nitrophenyl sulfonate. This mixture is then dissolved by ultrasound at 50° C. In a second flask, 3 equivalents of ligand (referred to as "hyetrz" and corresponding to 4-ethanol-1,2,4-triazole) in 2 mL water are added. This mixture is then dissolved by ultrasound at 50° C. The flask containing the ligand is then added to the reaction medium containing the iron salt and ultrasound is then applied for 15 minutes at 50° C. After one night, all of the product is sintered and a pink powder having hysteresis properties at the temperatures represented in FIG. 3 is obtained.

A thermochromatic ink obtained in an example embodiment of the invention, deposited on a paper medium, may:
 be "pink" in color at room temperature,
  "be erased" (in actuality it becomes transparent in the visible spectrum), by heating to 100° C. or less for 5 seconds, then
  be deposited again on paper substantially at the same location, in the visible form and again "pink" in color, at room temperature.

Figure 5:
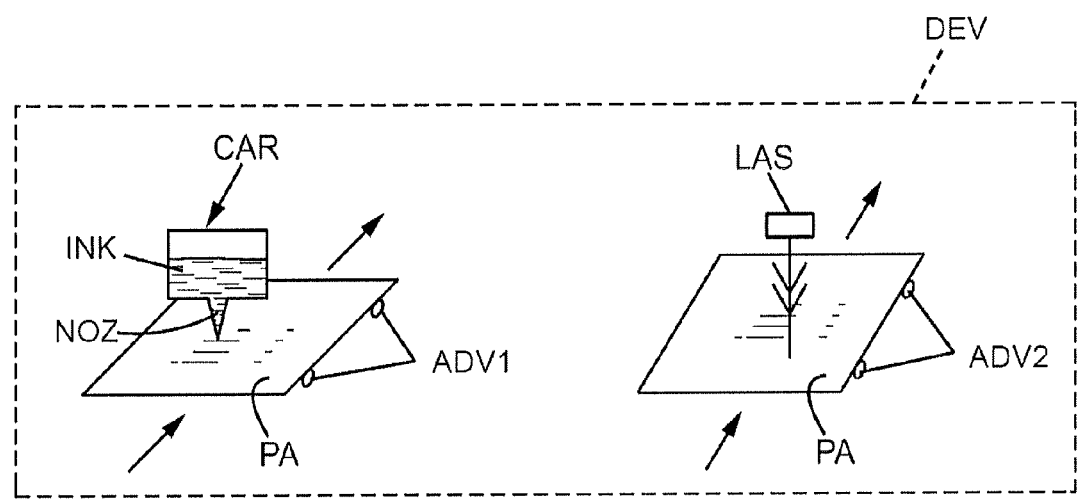

Represented in FIG. 5 is a cartridge CAR in the sense of the invention, comprising such an ink INK which can be injected by one or more nozzles NOZ onto a printing surface such as a sheet of paper PA. This arrangement can be in a device DEV, such as a printer or photocopier, comprising first advancement means ADV1 for advancing the sheet. The device DEV can also comprise a thermal treatment chamber containing a laser source LAS and means for sweeping the surface of a sheet of paper PA with a beam issuing from this source, in order to render the ink invisible. For this purpose, second advancement means ADV2 are provided for advancing to this thermal treatment chamber.

Of course, the invention is not limited to the embodiment described above as an example; it extends to other variants.

It is understood, for example, that the grouping of the printing device of FIG. 5 and the thermal treatment device with laser sweep can be in separate respective entities, rather than being part of the same common structure.

Two types of materials have been described with reference to FIGS. 2 and 3, presenting distinct respective hystereses. However, it is possible to consider a mix of these two materials in the same ink, for example the visible color of the "reversible" material being sufficiently transparent that it is not visible below 10° C.

Of course, the transition temperature thresholds given above are examples that are in no way limiting.

The invention claimed is:

1. A treatment method for printing a surface with an ink containing a compound that exhibits a change of electron spin state as a function of temperature, imparting optical properties such that said ink is:
 visible within a temperature range that includes an ambient temperature of about 20° C., and
 transparent in the visible spectrum when the ink is brought to a temperature outside said range and then brought back to a temperature within the range,
wherein the compound is in the form of nanometric particles suitable for ink jet printing techniques,
and wherein the ink becomes visible again by lowering the temperature to a low temperature of around or below 10° C.

2. The method according to claim 1, wherein the visibility of the ink follows a hysteresis cycle as a function of temperature, the ink being:
 visible, printed at a temperature within said range, and
 transparent, after thermal treatment at a temperature outside said range and then brought back to a temperature within the range.

3. The method according to claim 1, wherein the low temperature is around or below −150° C.

4. The method according to claim 1, wherein the compound contains at least one molecule comprising a transition metal of electron configuration $3d^4$, $3d^6$ and/or $3d^7$ and nitrogen-containing ligands comprising at least one triazole ligand.

5. The method according to claim 4, wherein at least one ligand contains a water molecule bound to the ligand by a hydrogen bond.

6. A treatment method for printing a surface with an ink containing a compound that exhibits a change in electron spin state as a function of temperature, imparting optical properties such that said ink is:
 visible within a temperature range that includes an ambient temperature of about 20° C., and
 transparent in the visible spectrum when the ink is brought to a temperature outside said range and then brought back to a temperature within the range,
wherein the compound is in the form of nanometric particles suitable for ink jet printing techniques,
wherein the method comprises a thermal treatment at said temperature outside the range, of a surface printed with said ink in order to render the ink transparent in the visible spectrum,
and wherein the thermal treatment is conducted by laser irradiation from a laser source comprising a wavelength within an optical absorption band of said ink.

7. The method according to claim 6, wherein the thermal treatment comprises an increase in temperature to said temperature outside the range, said temperature being greater than the temperatures within the range and being about 50 to 100° C.

8. A treatment method for printing a surface with an ink containing a compound that exhibits a change of electron spin state as a function of temperature, imparting optical properties such that said ink is:
 visible within a temperature range that includes an ambient temperature of about 20° C., and
 transparent in the visible spectrum when the ink is brought to a temperature outside said range and then brought back to a temperature within the range,
wherein the compound is in the form of nanometric particles suitable for ink jet printing techniques,
wherein the method comprises a thermal treatment at said temperature outside the range, of a surface printed with said ink in order to render the ink transparent in the visible spectrum,
and wherein the length of the thermal treatment is on the order of five seconds.

9. An ink for printing on a surface, comprising a compound in the form of nanometric particles that change the electron spin state as a function of temperature, imparting optical properties such that said ink is:
 visible within a temperature range that includes an ambient temperature of around 20° C., and
 transparent in the visible spectrum when the ink is brought to a temperature outside of said range and then brought back to a temperature within the range, wherein the compound is in the form of nanometric particles suitable for ink jet printing techniques, and wherein the ink becomes visible again by lowering the temperature to a low temperature of around or below 10° C.

10. A cartridge containing an ink for printing on a surface, comprising a compound in the form of nanometric particles that change the electron spin state as a function of temperature, imparting optical properties such that said ink is:

visible within a temperature range that includes an ambient temperature of around 20° C., and transparent in the visible spectrum when the ink is brought to a temperature outside of said range and then brought back to a temperature within the range, wherein the compound is in the form of nanometric particles suitable for ink jet printing techniques, and wherein the ink becomes visible again by lowering the temperature to a low temperature of around or below 10° C.

11. A printing device comprising at least one cartridge containing an ink for printing on a surface, said ink comprising a compound in the form of nanometric particles that change the electron spin state as a function of temperature, imparting optical properties such that said ink is:

visible within a temperature range that includes an ambient temperature of around 20° C., and transparent in the visible spectrum when the ink is brought to a temperature outside of said range and then brought back to a temperature within the range, the printing device further comprising means for applying jets of ink onto the surface, wherein the compound is in the form of nanometric particles suitable for ink jet printing techniques, and wherein the ink becomes visible again by lowering the temperature to a low temperature of around or below 10° C.

12. The device comprising means for advancing a surface printed with an ink according to claim 9, to a thermal treatment chamber comprised in the device, in order to carry out a thermal treatment at said temperature outside the range, of a surface printed with said ink in order to render the ink transparent in the visible spectrum.

13. The method for producing a compound containing at least one molecule comprising a transition metal of electron configuration $3d^4$, $3d^6$ and/or $3d^7$ and nitrogen-containing ligands comprising at least one triazole ligand, in order to carry out the method according to claim 1, wherein the method comprises a synthesis of said molecule, assisted by the use of ultrasound.

* * * * *